US012056565B2

(12) United States Patent
Tu et al.

(10) Patent No.: US 12,056,565 B2
(45) Date of Patent: Aug. 6, 2024

(54) STRUCTURAL ISOLATION OF RFID ANTENNA

(71) Applicant: ZEBRA TECHNOLOGIES CORPORATION, Lincolnshire, IL (US)

(72) Inventors: Qing Tu, Stony Brook, NY (US); Ryan Gong, Mineola, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 118 days.

(21) Appl. No.: 17/683,952

(22) Filed: Mar. 1, 2022

(65) Prior Publication Data

US 2023/0229876 A1    Jul. 20, 2023

Related U.S. Application Data

(60) Provisional application No. 63/299,634, filed on Jan. 14, 2022.

(51) Int. Cl.
*G06K 7/10* (2006.01)
*G06K 19/07* (2006.01)
*H01Q 1/22* (2006.01)

(52) U.S. Cl.
CPC ..... *G06K 7/10386* (2013.01); *G06K 19/0723* (2013.01); *H01Q 1/2216* (2013.01)

(58) Field of Classification Search
CPC ........... G06K 19/0723; G06K 7/10316; G06K 7/10336; G06K 7/10386; G06K 7/10881; H01Q 1/2216; H01Q 7/00
See application file for complete search history.

(56) References Cited

U.S. PATENT DOCUMENTS

| 10,790,572 | B1* | 9/2020 | DiGregorio | H01Q 9/285 |
| 11,165,134 | B1* | 11/2021 | Kingman | H01Q 1/084 |
| 2003/0194908 | A1* | 10/2003 | Brown | H01R 31/06 |
| | | | | 439/620.22 |
| 2009/0289116 | A1 | 11/2009 | Copeland et al. | |

(Continued)

FOREIGN PATENT DOCUMENTS

CN    108520192 A    9/2018

OTHER PUBLICATIONS

Combined Search and Examination Report for Great Britain Application No. 2300419.5 mailed on Jul. 11, 2023.

*Primary Examiner* — Omer S Khan
(74) *Attorney, Agent, or Firm* — Yuri Astvatsaturov

(57) ABSTRACT

Handheld scanning devices are disclosed herein. An example handheld scanning device includes a main housing, an antenna housing, an antenna mounting bracket, and a first radio frequency identification (RFID) antenna. The main housing includes a main body portion and a grip portion operably coupled with the main body. The main housing defines a main housing cavity. The antenna housing is operably coupled with the main housing and defines an antenna housing cavity. The antenna mounting bracket is at least partially disposed within the antenna housing cavity and is operably coupled with the antenna housing and the main body portion of the main housing. The first RFID antenna is at least partially disposed within the antenna housing cavity and is operably coupled with the antenna mounting bracket.

13 Claims, 16 Drawing Sheets

(56) References Cited

U.S. PATENT DOCUMENTS

| | | | |
|---|---|---|---|
| 2010/0103238 A1* | 4/2010 | Neuhard | B65C 11/021 |
| | | | 347/109 |
| 2016/0359223 A1* | 12/2016 | Zhao | H01Q 1/42 |
| 2018/0260592 A1* | 9/2018 | Trishaun | G06K 7/10316 |
| 2019/0058239 A1* | 2/2019 | Smith | H01Q 21/0025 |
| 2023/0216204 A1* | 7/2023 | Ribeiro | H01Q 21/28 |
| | | | 343/702 |

* cited by examiner

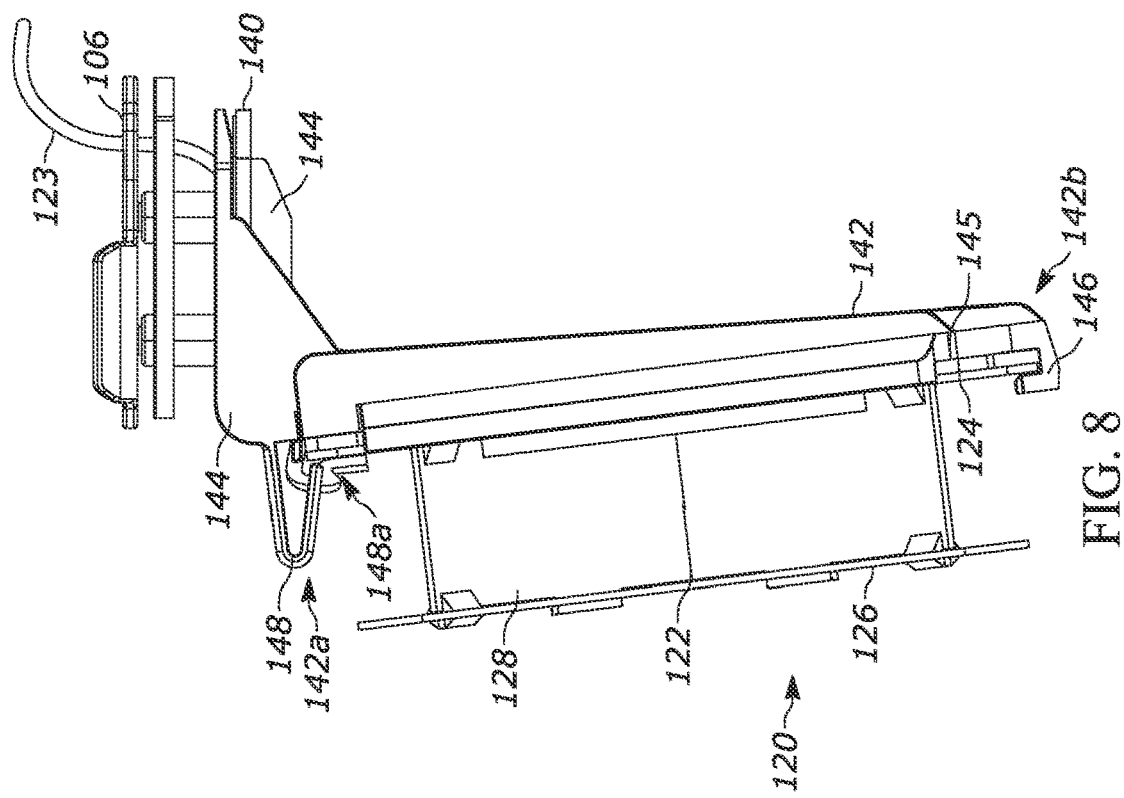
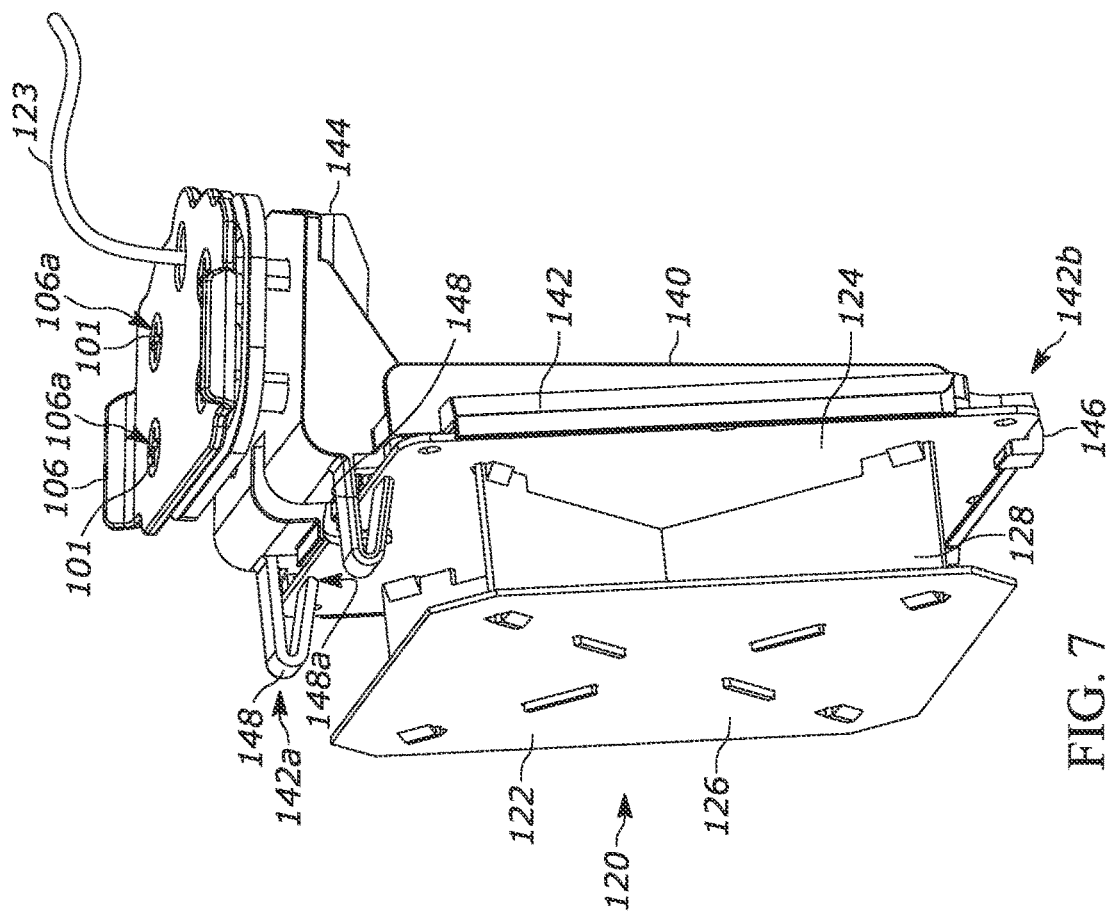

STRUCTURAL ISOLATION OF RFID ANTENNA

CROSS REFERENCE TO RELATED APPLICATIONS

This application claims the benefit of U.S. Provisional Application No. 63/299,634 filed on Jan. 14, 2022, the entirety of which is herein expressly incorporated by reference.

BACKGROUND

Handheld barcode readers and/or scanning devices may be used in various environments such as, for example, warehouse environments, checkout stations, and/or other similar settings. These scanning devices may come in varying configurations and/or sizes depending on a use environment. For example, some handheld scanning devices may be in the form of a scan "sled" or "gun," while other handheld scanning devices may be in the form of a scan sled with an additional terminal coupled therewith. Other arrangements are possible. In some configurations of these handheld scanning devices, a radio frequency identification (RFID) antenna may be positioned in a front-facing location of the device, and may extend from a main portion thereof. Due to performance (e.g., signal strength) requirements, these RFID antennas may be mounted within the device without using relatively strong materials such as metals. As such, in the event that a user inadvertently drops the device, the portion of the device that accommodates the RFID antenna may deform which may result in the antenna connection may being susceptible to breaking, internal stresses, and/or other damage. Some existing devices incorporate designs that prevent portions of the device from deforming. However, such devices may be cumbersome and uncomfortable for a user to use and maneuver.

Accordingly, there is a need for improved accessories having improved functionalities.

SUMMARY

Handheld scanning devices are disclosed herein. An example handheld scanning device includes a main housing, an antenna housing, an antenna mounting bracket, and a first radio frequency identification (RFID) antenna. The main housing includes a main body portion and a grip portion operably coupled with the main body. The main housing defines a main housing cavity. The antenna housing is operably coupled with the main housing and defines an antenna housing cavity. The antenna mounting bracket is at least partially disposed within the antenna housing cavity and is operably coupled with the antenna housing and the main body portion of the main housing. The first RFID antenna is at least partially disposed within the antenna housing cavity and is operably coupled with the antenna mounting bracket.

In a variation of this embodiment, the antenna housing may include an antenna front housing and an antenna rear housing. In some of these examples, the antenna rear housing may be operably coupled with a main body bracket member that is at least partially disposed within the main housing cavity. In some examples, the antenna front housing may be operably coupled with an upper portion of the main body portion. In these and other examples, the antenna rear housing may be integrally formed with the main housing.

In some forms, the antenna housing may include a plurality of stiffening ribs disposed within the antenna housing cavity to limit movement of the antenna mounting bracket.

In some examples, the first RFID antenna includes a first circuit board, a second circuit board, and a structural support disposed between the first and the second circuit boards. The first circuit board may be electrically coupled with the second circuit board. In some approaches, the structural support may be in the form of a third circuit board and a fourth circuit board.

In some variations of these embodiments, the antenna mounting bracket includes a bracket body and a flange portion. The bracket body may be rotatably displaceable relative to the flange portion. Further, in some examples, the antenna mounting bracket may include at least one hook member and at least one resilient member. The at least one hook member may receive a first end of the RFID antenna. The at least one resilient member may receive a second end of the RFID antenna.

In some examples, the device may include an imaging system at least partially disposed within the main body cavity. The imaging system may capture at least one image of an object appearing in a field of view (FOV) of the device.

In accordance with a second embodiment, an antenna system for a handheld scanning device may include an antenna housing defining an antenna housing cavity, a floating bracket at least partially disposed within the antenna housing cavity, and a RFID antenna at least partially disposed within the antenna housing cavity. The antenna mounting bracket is operably coupled with the antenna housing. The floating bracket is movable within the antenna housing cavity.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 illustrates a front perspective view of an example antenna assembly of the example handheld scanning device of FIGS. 1-6 in accordance with various embodiments.

FIG. 8 illustrates a side elevation view of the example antenna assembly of the example handheld scanning device of FIGS. 1-7 in accordance with various embodiments.

Figure 1:
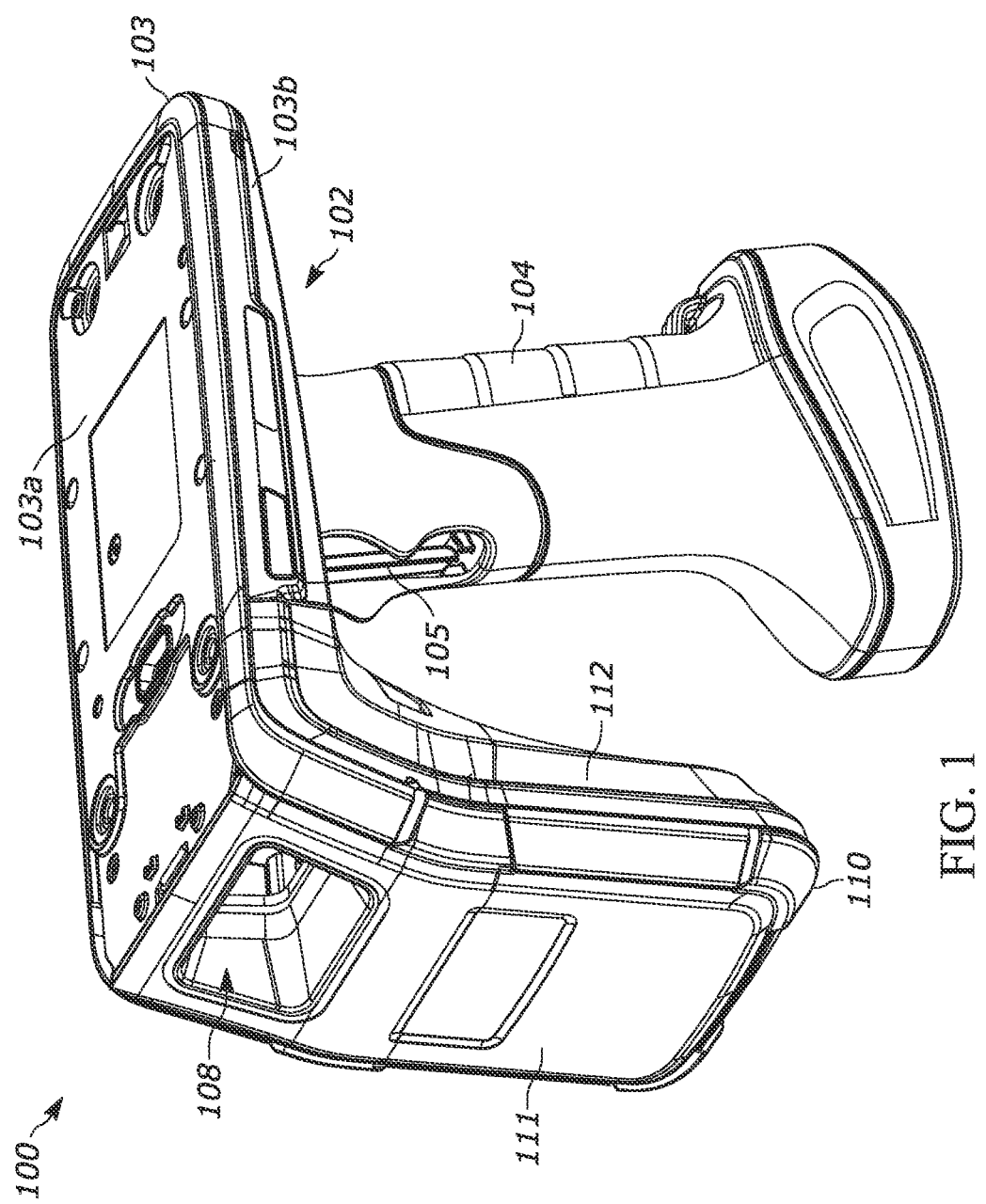
FIG. 1 illustrates a front perspective view of an example handheld scanning device in accordance with various embodiments.
Figure 2:
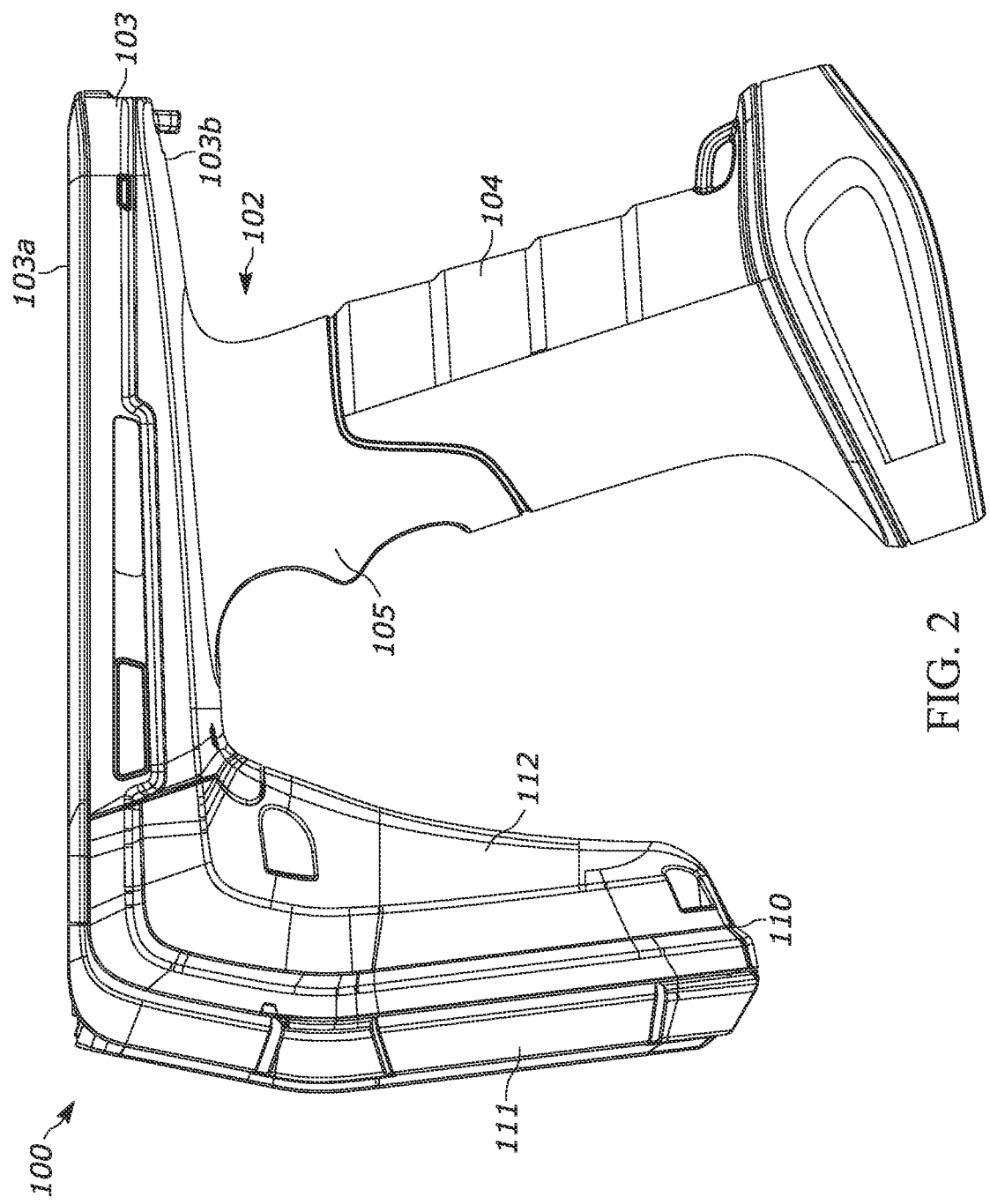
FIG. 2 illustrates a side elevation view of the example handheld scanning device of FIG. 1 in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a handheld scanning device is provided that includes a support structure for a radio frequency identification (RFID) antenna. The scanning device may be modular in that it may include different adapters to accommodate varying terminals (e.g., mobile computing devices) or other devices. The scanning device includes an RFID antenna capable of reading RFID tags in varying environments such as, for example, warehouses and the like. Notably, the scanning devices disclosed herein include a structural mechanism that allows the RFID antenna to "float" within an antenna housing or enclosure, which advantageously may prevent the RFID antenna from incurring damage and/or experiencing stress in the event of an unintentional drop or bump.

Turning to FIGS. 1-14, a first example handheld scanning device 100 is provided that includes a main housing 102, an antenna housing 110, and an antenna assembly 120 including an RFID antenna 122 and an antenna mounting bracket (or floating bracket) 140. The main housing 102 includes a main body portion 103 and a grip portion 104 operably coupled with the main body portion 103 that cooperate to define a cavity 102a. The main body portion 103 further includes an upper portion 103a and a lower portion 103b.

The imaging system 150 includes an imaging sensor, a circuit board, and any number of additional components disposed within the internal cavity 102a of the main body portion 103. At least a portion of the imaging system 150 is positioned at or near a window 108 in the main body portion 103 of the main housing 102.

The grip portion 104 is dimensioned to be grasped by a user and may include a trigger 105 that activates the imaging system 150 to capture and decode the at least one image appearing in a field of view (FOV) and/or that activates the antenna assembly 120 to receive a signal via the RFID antenna 122.

The antenna housing 110 includes an antenna front housing 111 and an antenna rear housing 112 that at least partially form an antenna housing cavity 110a. In the illustrated examples of FIGS. 1-14, the antenna rear housing 112 is coupled with the main body portion 103 of the main housing 102 via fasteners 101. However, in some examples (e.g., FIG. 16), the antenna rear housing 112 may be integrally formed with the main body portion 103 of the main housing 102. Similarly, in the illustrated example of FIGS. 1-14, the antenna front housing 111 may be operably coupled with the main body portion 103 of the main body housing 102 via fasteners 101.

The antenna rear housing 112 includes any number of stiffening ribs 114. Such stiffening ribs 114 may be in the form of protrusions that extend inwardly into the antenna housing cavity 110a. In some examples, the antenna front housing 111 may also include stiffening ribs (not illustrated).

The antenna assembly 120 includes the RFID antenna 122 and the antenna mounting bracket 140. Generally speaking, the RFID antenna 122 is operably coupled with the antenna mounting bracket 140, which is in turn operably coupled with the antenna housing 110 and/or the main housing 102. The RFID antenna 122 includes a first circuit board or ground plane 124 and a second circuit board 126 that includes an emitting element. A structural support 128 is disposed between the first circuit board 124 and the second circuit board 126. Further, an electrical coupling 123 couples the RFID antenna 122 with the remainder of the imaging system 150 (e.g., the trigger 105, a controller, etc.).

The first and second circuit boards 124, 126 are electrically and/or communicatively coupled with each other via solder joints or pads 127 soldered to each circuit board to mechanically and electrically couple the first and second circuit boards 124, 126. In some examples, the structural support 128 may be in the form of third and fourth respective circuit boards that are communicatively coupled with the first and second circuit boards 124, 126. Such an arrangement may provide increased range of the scanning device. In the illustrated example, the structural support 128 forms an X-shape, though other arrangements (e.g., circular or round, triangular, square, etc.) may be used. Further, the structural support 128 may be insertably coupled into an opening formed in the first and second circuit boards 124, 126. The structural support 128 may have a desired thickness to create a gap having a predetermined width between first and second circuit boards 124, 126. In some alternative arrangements, the structural support 128 may be constructed from a plastic material, as in some arrangements, it may be desired to have a minimal amount of metal near the first circuit board 124. Other arrangements are possible.

The antenna mounting bracket 140 includes a bracket body 142 and a flange portion 144 operably coupled with an upper portion 142a of the bracket body 142. In some examples, the bracket body 142 may be integrally formed with the flange portion 144. The antenna mounting bracket 140 may be constructed from a polymeric material that may be capable of flexing or deforming. The bracket body 142 is generally planar and is dimensioned to be approximately the same size as the first circuit board 124. A lower portion 142b of the bracket body 142 includes any number of hook members 146 extending therefrom. The upper portion 142a of the bracket body 142 includes any number of resilient members 148 extending therefrom. In the illustrated example, the resilient member or members 148 may be in the form of a resilient tab having a catch or finger 148a. Other examples are possible.

The first circuit board 124 may be coupled with the bracket body 142. An adhesive 145 in the form of a film, a spray, or any other suitable material may be applied to one or both of the first circuit board 124 or the bracket body 142. The circuit board 124 may be slotted into the hook member or members 146, and pressed onto and/or against the bracket body 142. This movement causes the first circuit board 124 to deform the resilient member or members 148 until the first circuit board 124 is fully seated against the bracket body 142. At this point, the adhesive 145 retains the circuit board against the bracket body 142, and the resilient member 148 returns to its non-deformed configuration, and the catch or finger 148a thereof prevents the first circuit board 124 from moving relative to the bracket body 142. Accordingly, multiple components cooperate to couple the first circuit board 124 with the bracket body 142: the adhesive 145; the hook or hook members 146, and the resilient member or members 148. This engagement ensures the circuit board 124 (and thus the entire RFID antenna 122) moves with the antenna mounting bracket 140.

The flange portion 144 of the antenna mounting bracket 140 includes openings 144a to secure the flange portion 144 with portions of the main housing 102 and/or the main body bracket member 106 via fasteners 101. The flange portion 144 may include any number of support braces (e.g., a buttress) 149 that provide structural support and/or strengthen the bracket body 142 and the flange portion 144. As illustrated in FIGS. 7-14, the flange portion 144 may be coupled with the main body bracket member 106. In some examples, the main body bracket member 106 is constructed from a rigid material such as metal, though other examples are possible.

The antenna assembly 120 is disposed within the antenna housing cavity 110a. Further, the antenna mounting bracket 140 (and more specifically, the flange portion 144 thereof) is coupled with the antenna rear housing 112 as well as the main body portion 103 (i.e., the lower portion 103b) of the main housing 102 via fasteners 101. The antenna rear housing 112 includes a mounting surface 112a that has any number of openings 112b to receive the fasteners 111. Further, the lower portion 103b of the main body portion 103 includes any number of openings 103c to receive fasteners 101. As illustrated in FIGS. 3, 4, 9, and 14, the openings 144a, 112b, 103c of the flange portion 144, the antenna rear housing 112, and the lower portion 103b, respectively, are aligned such that a fastener 101 may secure these components to each other. Further, in some examples, openings 106a of the main body bracket member 106 may also be aligned with any number of these openings 144a, 112b, 103c to additionally retain the main body bracket member 106 therewith. So arranged, the antenna assembly 120 is secured relative to the main housing 102.

Figure 3:
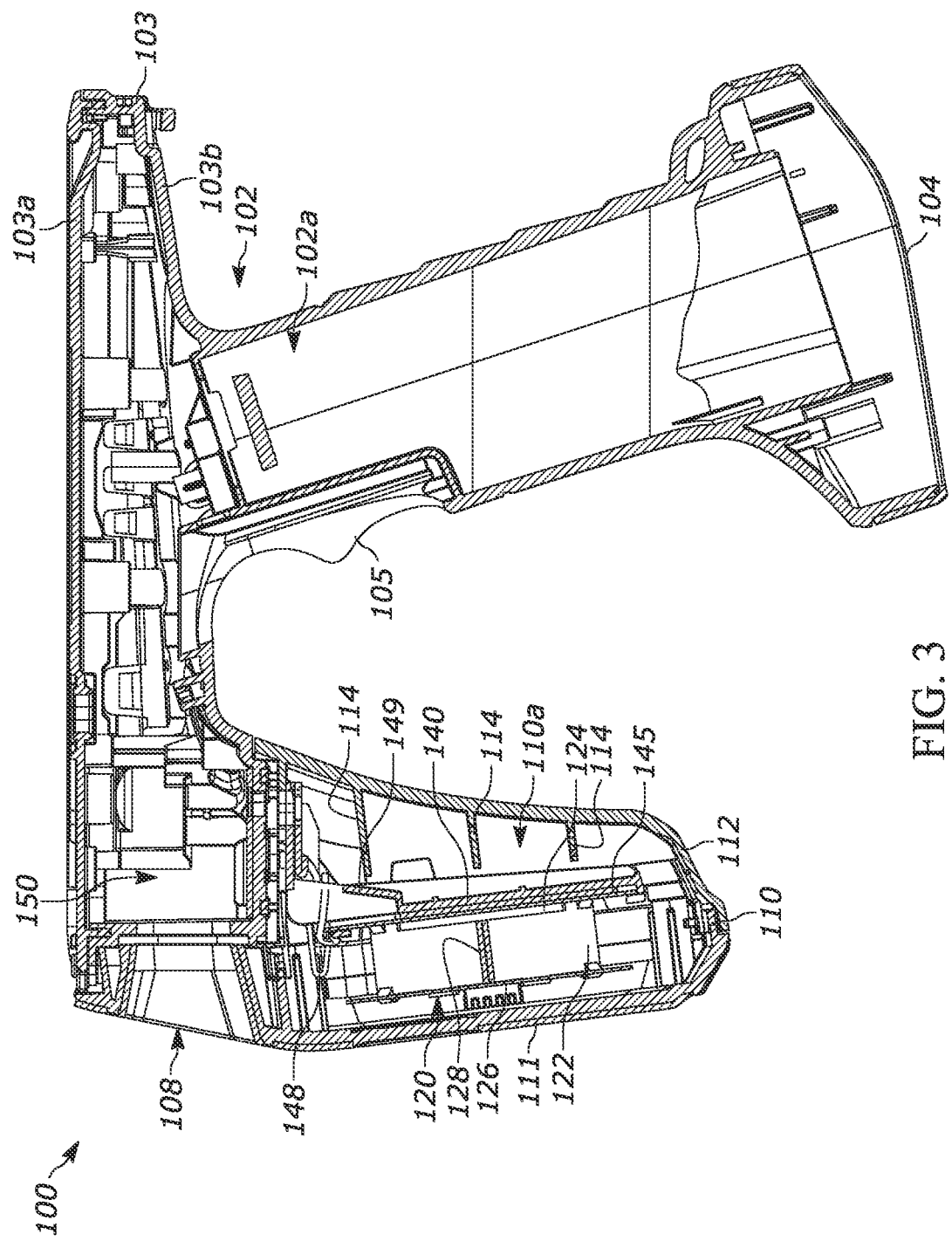
FIG. 3 illustrates a side elevation cross-sectional view of the example handheld scanning device of FIGS. 1 and 2 in accordance with various embodiments.
Figure 4:
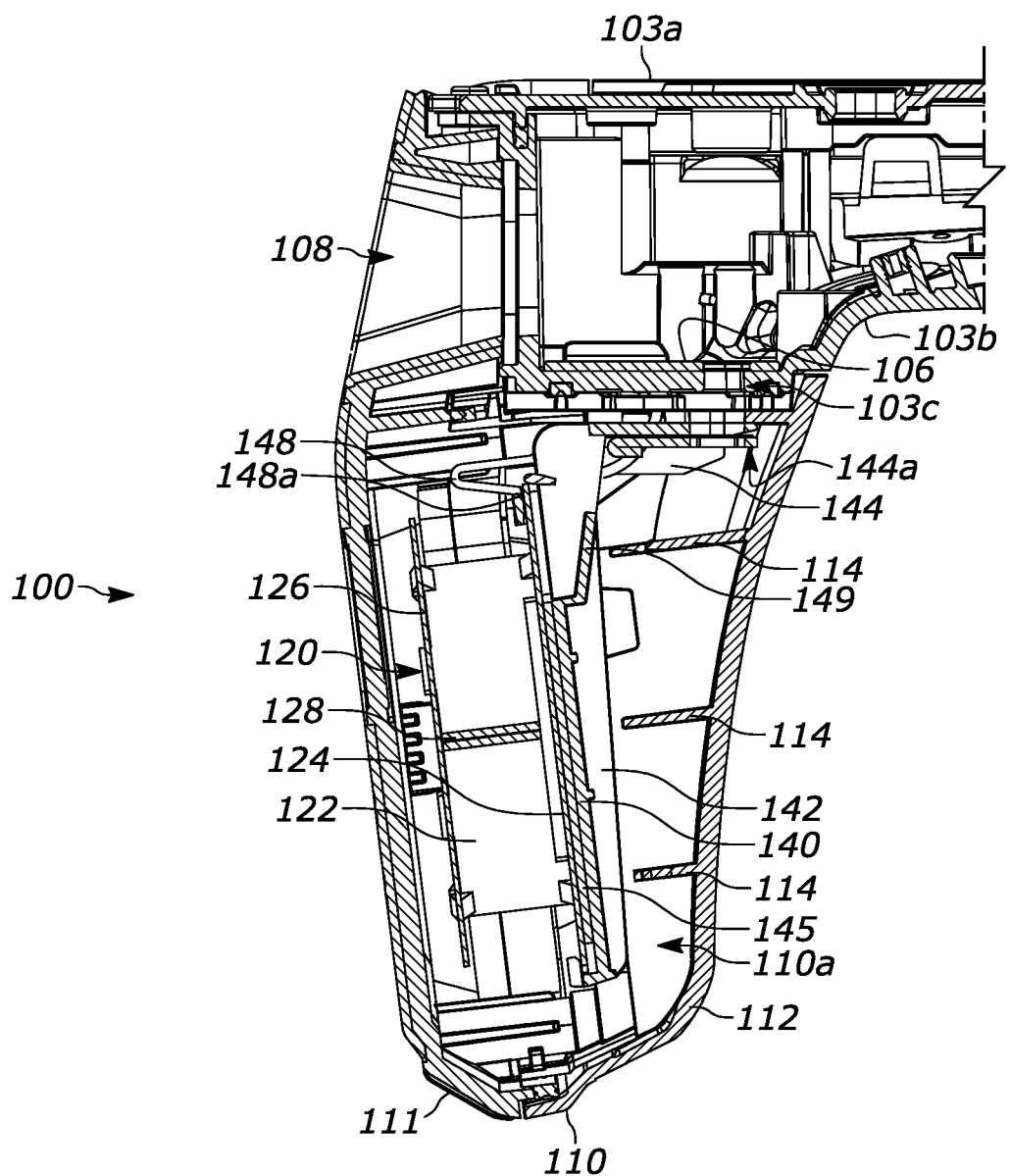
FIG. 4 illustrates a side elevation cross-sectional view of an example antenna housing of the example handheld scanning device of FIGS. 1-3 in accordance with various embodiments.
Figure 5:
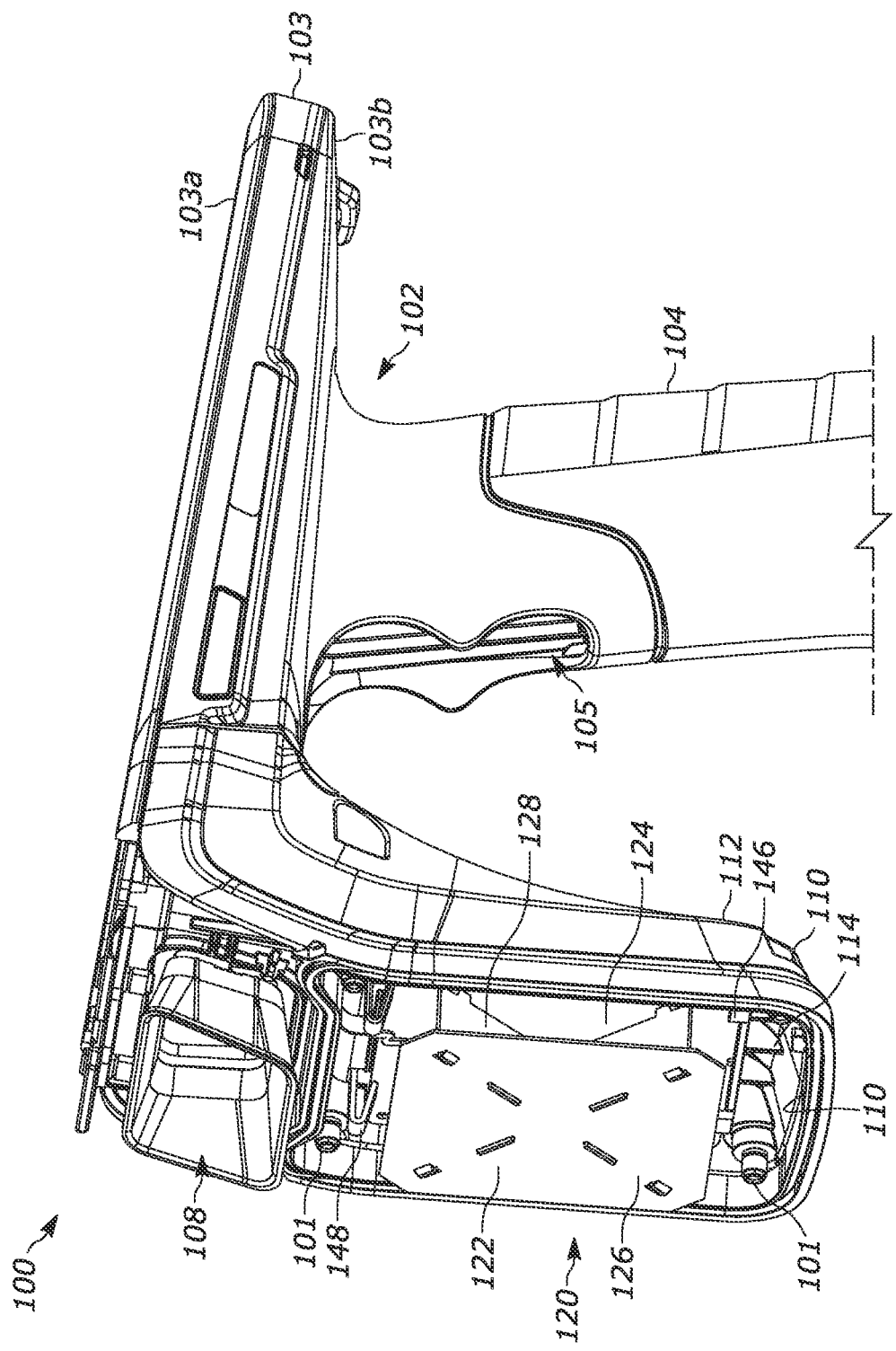
FIG. 5 illustrates a front perspective view of the example handheld scanning device of FIGS. 1-4 having a portion of a housing removed in accordance with various embodiments.
Figure 6:
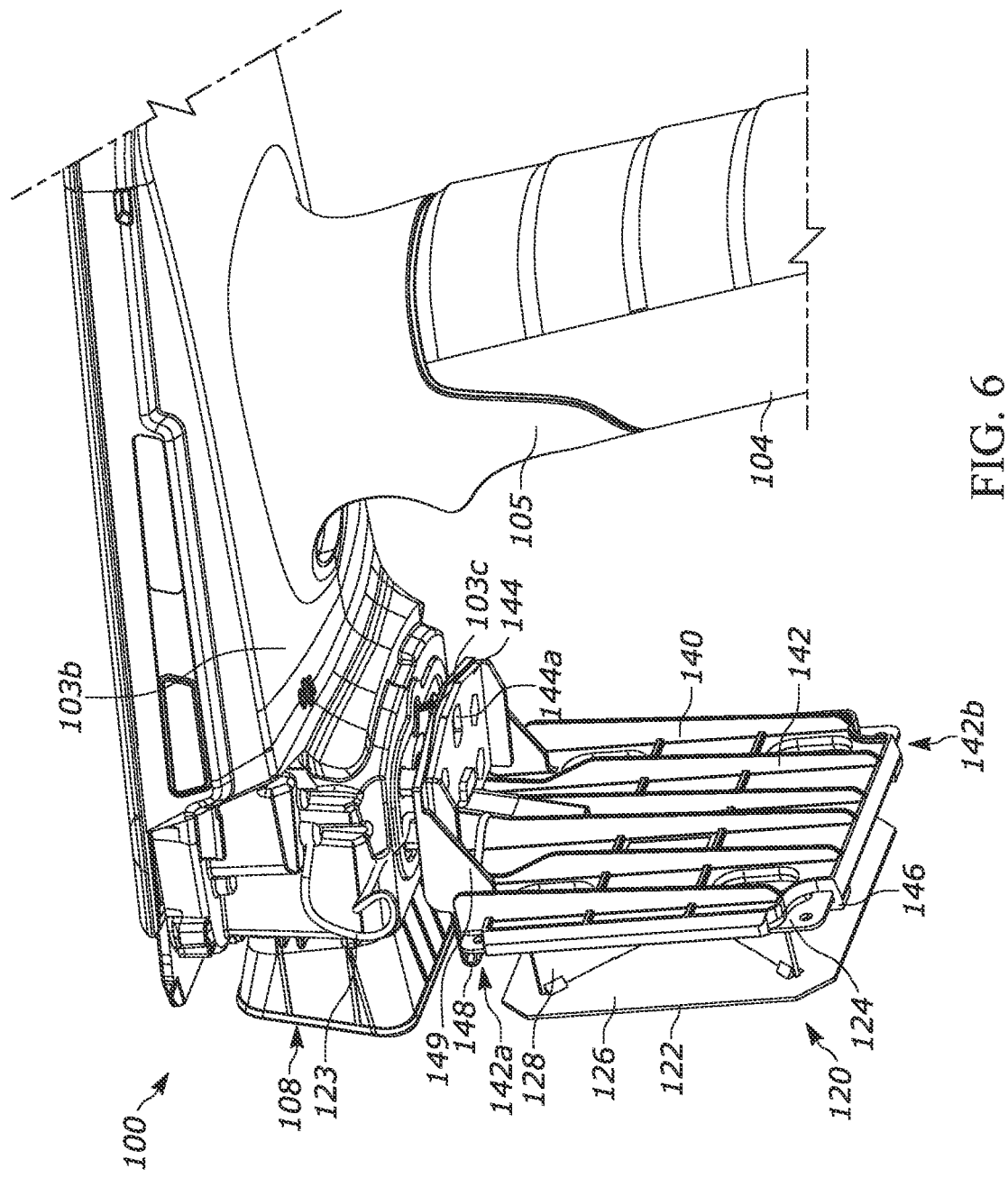
FIG. 6 illustrates a rear perspective view of the example handheld scanning device of FIGS. 1-5 having a portion of a housing removed in accordance with various embodiments.
Figure 9:
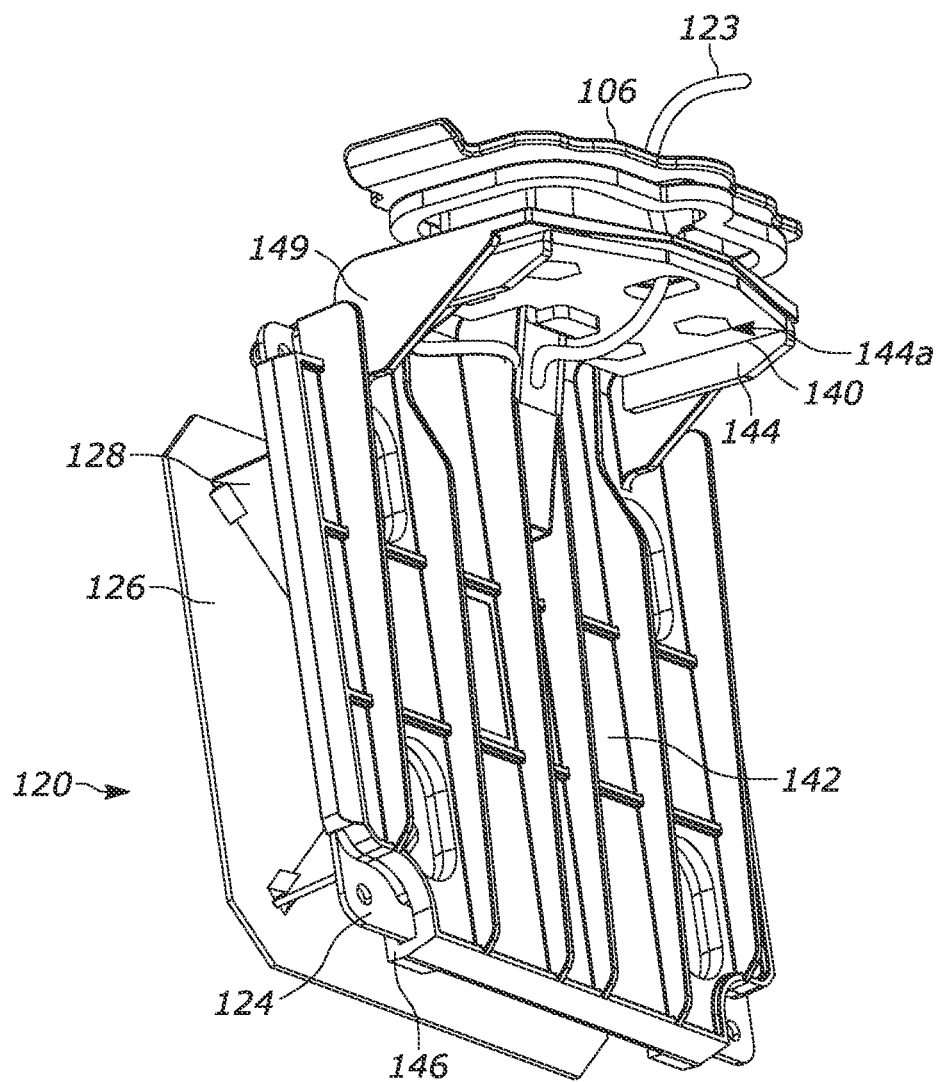
FIG. 9 illustrates a rear perspective view of an example antenna assembly of the example handheld scanning device of FIGS. 1-8 in accordance with various embodiments.
Figure 10:
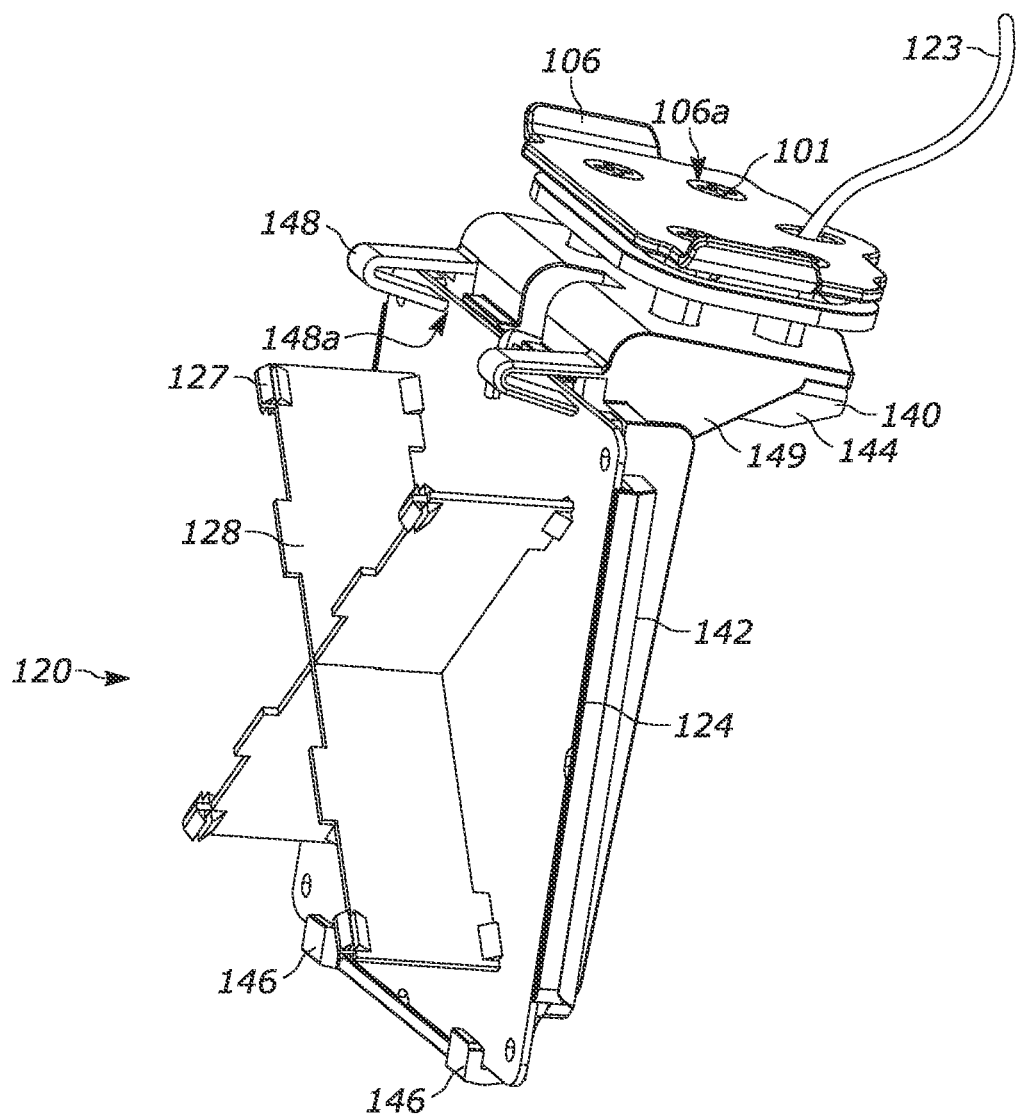
FIG. 10 illustrates a front perspective view of a portion of the example antenna assembly of the example handheld scanning device of FIGS. 1-9 in accordance with various embodiments.
Figure 11:
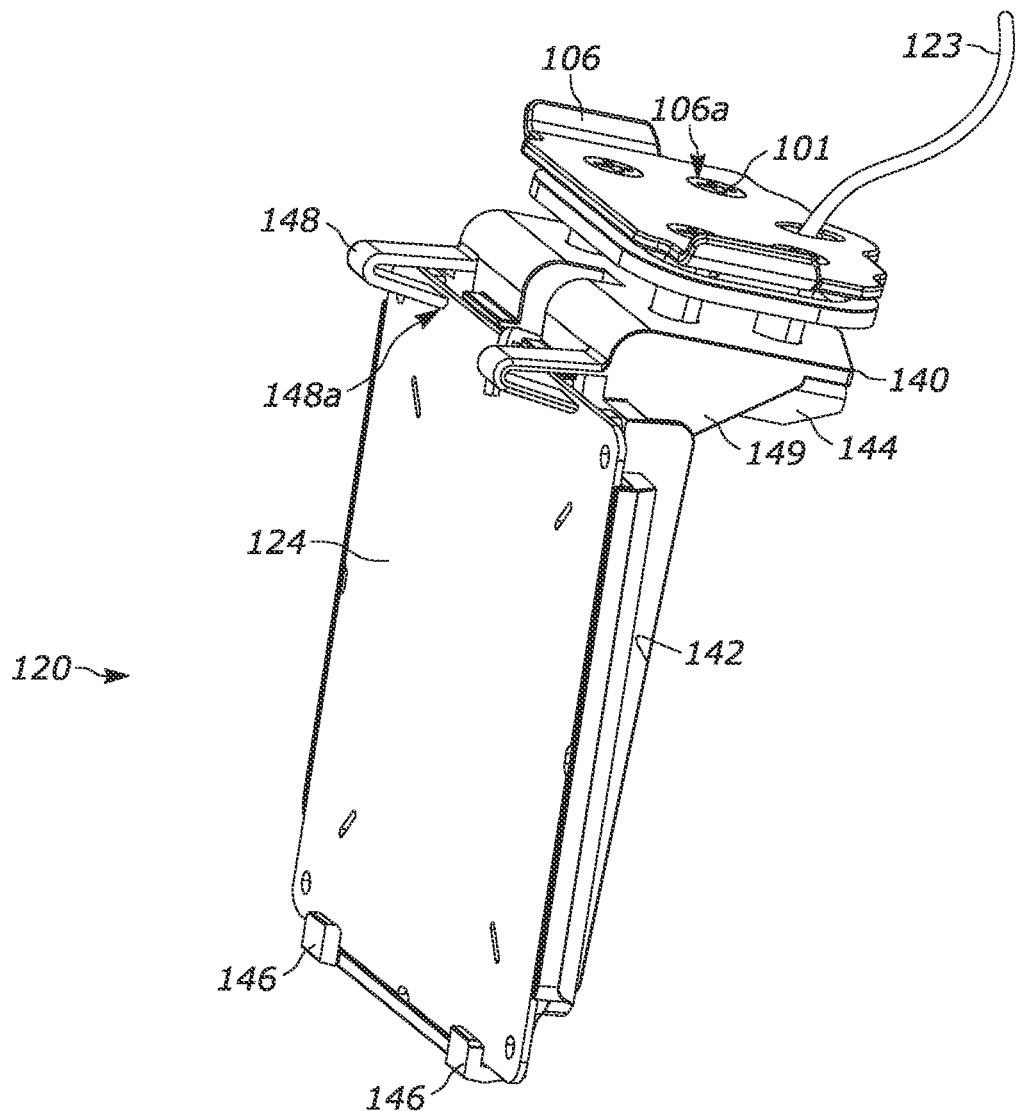
FIG. 11 illustrates a front perspective view of a portion of the example antenna assembly of the example handheld scanning device of FIGS. 1-10 in accordance with various embodiments.
Figure 12:
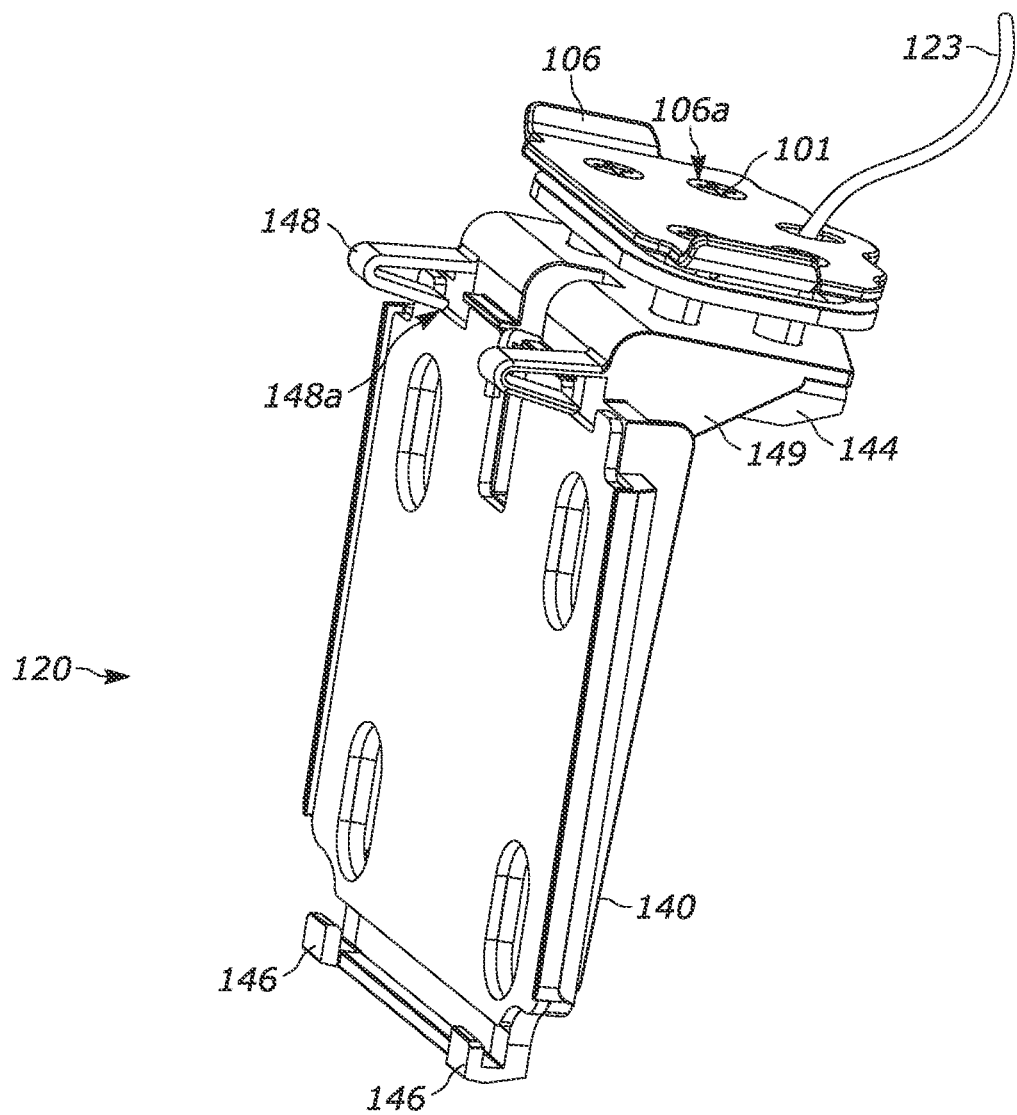
FIG. 12 illustrates a front perspective view of a portion of the example antenna assembly of the example handheld scanning device of FIGS. 1-11 in accordance with various embodiments.
Figure 13:
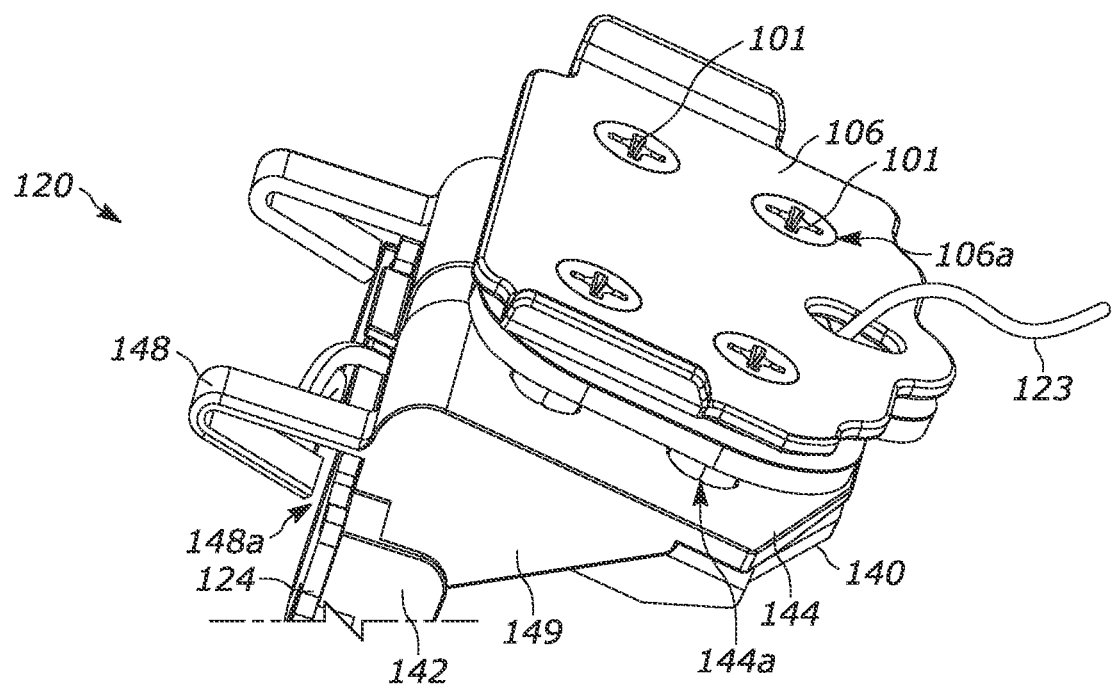
FIG. 13 illustrates an upper perspective view of a portion of the example antenna assembly of the example handheld scanning device of FIGS. 1-12 in accordance with various embodiments.
Figure 14:
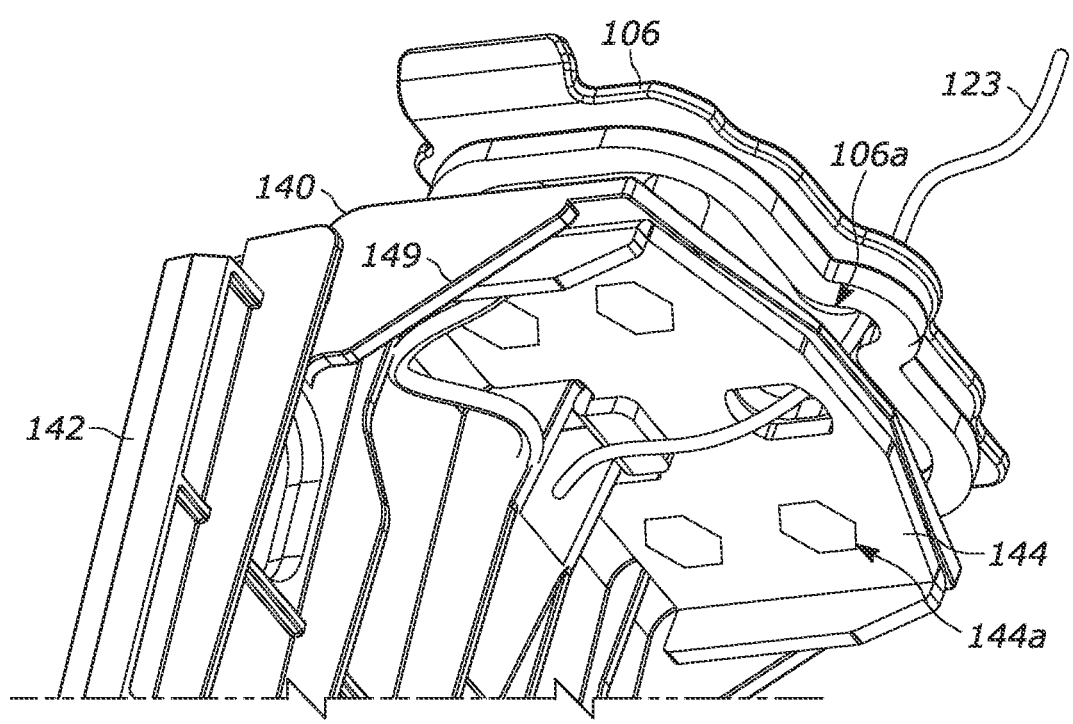
FIG. 14 illustrates a lower perspective view of a portion of the example antenna assembly of the example handheld scanning device of FIGS. 1-13 in accordance with various embodiments.

In this arrangement, the antenna assembly 120 is disposed within the antenna housing cavity 110a in a way that the RFID antenna 122 and the bracket body 142 floats there within and does not touch an internal surface of the antenna housing 110. This arrangement advantageously results in several "shock absorption" approaches. First, in this arrangement, and as illustrated in FIGS. 3 and 4, a portion of the support member 149 may be positioned near one of the stiffening ribs 114 formed in and/or by the antenna rear housing 112. In the event of an unintentional drop, the support member 149 may act as a ledge or stop that prevents the antenna mounting bracket 140 from displacing a significant distance. This engagement limits the amount of flexing that the antenna mounting bracket 140 may experience, which in turn reduces stress on the RFID antenna 122. Additionally, in the illustrated example, stiffening ribs 114 positioned lower along the antenna rear housing 112 may also engage the bracket body 142 to limit displacement and flexing.

Further, any internal flexing is first experienced by the flange portion 144 and its engagement with the main body bracket 106. These two components cooperate to absorb shock so that the bracket body 142 experiences reduced stress.

Yet further still, this arrangement allows the antenna mounting bracket 140 (i.e., the flange portion 144) to flex while the bracket body 142 remains relatively rigid and not deformed. In other words, the bracket body 142 may be rotatably displaceable relative to the flange portion 144.

The antenna front housing 111 is coupled with the antenna rear housing 112 and/or the upper portion 103a of the main body portion 103. This connection with the upper portion 103a creates an additional support point that also reduces and/or limits the amount the antenna housing 110 may deform.

In some arrangements (not illustrated), the flange portion 144 may not be coupled with the antenna rear housing 112, but the antenna rear housing 112 instead may couple with the main housing 102 via other fasteners. Other arrangements are possible.

Because the RFID antenna 122 is not directly coupled with any frame/housing member, in the event the device 100 experiences a bump and/or unintentional drop, the RFID antenna 122 floats within the antenna housing cavity 110a. More specifically, the antenna mounting bracket 140 flexes and absorbs deformation, but prevents the RFID antenna 122 from experiencing deformation. While the lowest point of the antenna housing 110 experiences the most deformation relative to the main housing 102, the RFID antenna 122 will not move as much as the housing antenna housing 110. Additionally, the engagement between the antenna mounting bracket 140 and the stiffening ribs 114 also prevents backward rotation. These features cooperate to cause the RFID antenna 112 to experience minimal stresses.

So arranged, the RFID antenna 122 is structurally isolated from external stressors while incorporating minimal amounts of metal that could potentially adversely impact operation thereof. The scanning device 100 is ergonomic and easily grippable by a user, and may receive additional components such as adapters (e.g., terminals which may be coupled with the upper portion 103a of the main body portion 103).

Figure 15:
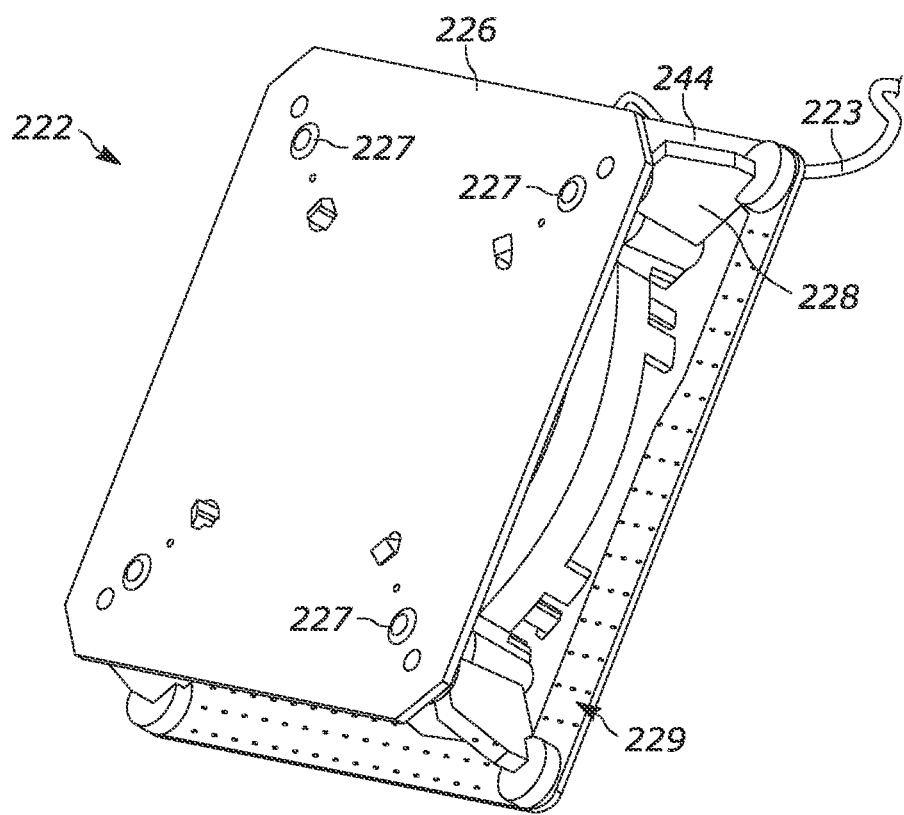
FIG. 15 illustrates a front perspective view of an alternative example RFID antenna assembly for a handheld scanning device in accordance with various embodiments.

It is appreciated that the teaching described herein may be applied to any number of alternative scanning devices having varying characteristics. For example, as illustrated in FIG. 15, an alternative RFID antenna assembly 222 is provided that includes a structural support 228 having openings 229 that may receive a metal pin 227 extending therethrough that may be soldered to the first and second circuit boards 224, 226. It is appreciated that the RFID antenna assembly 222 may include any number of similar features as the RFID antenna 122 illustrated in FIGS. 1-14, and as such, these features will not be discussed in substantial detail. Such features described in the RFID antenna 122 may be incorporated into the RFID antenna 222, and vice-versa.

Figure 16:
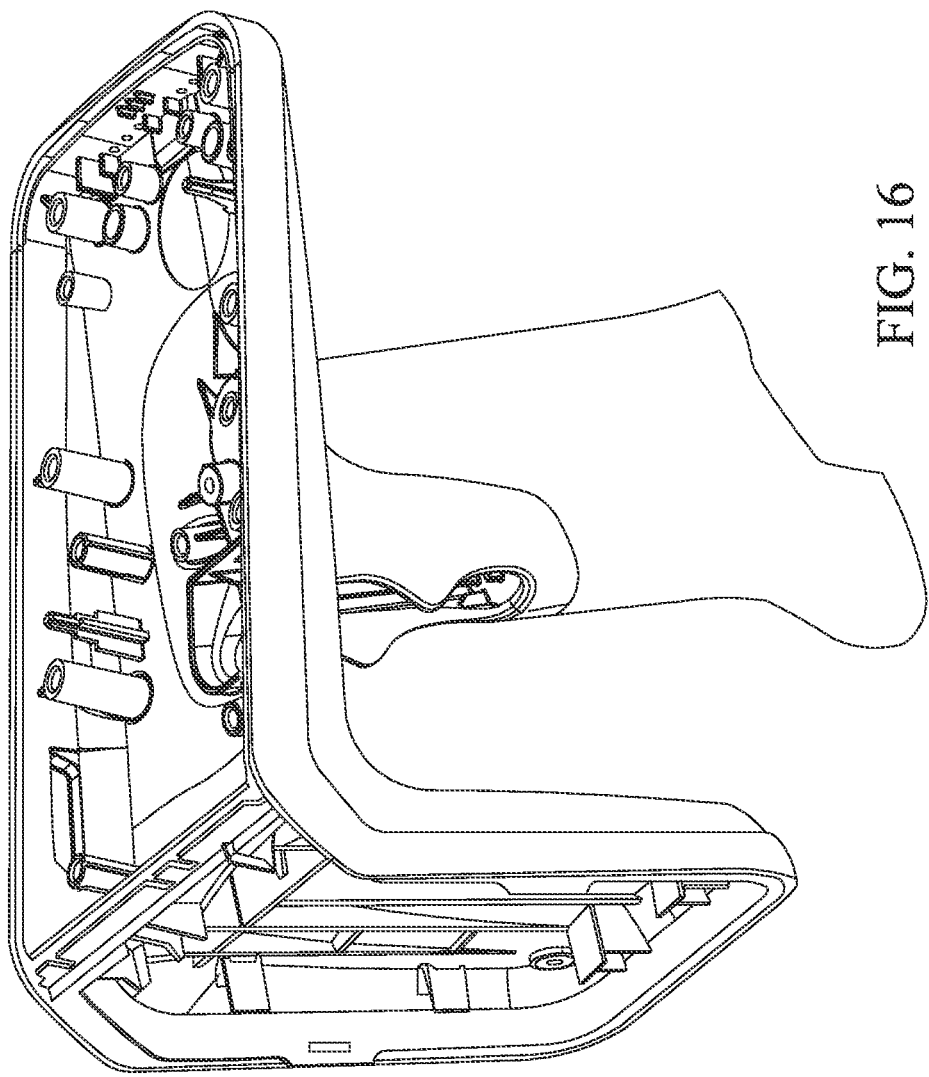
FIG. 16 illustrates a front perspective view of an alternative example housing for a handheld scanning device in accordance with various embodiments.
Figure 17:
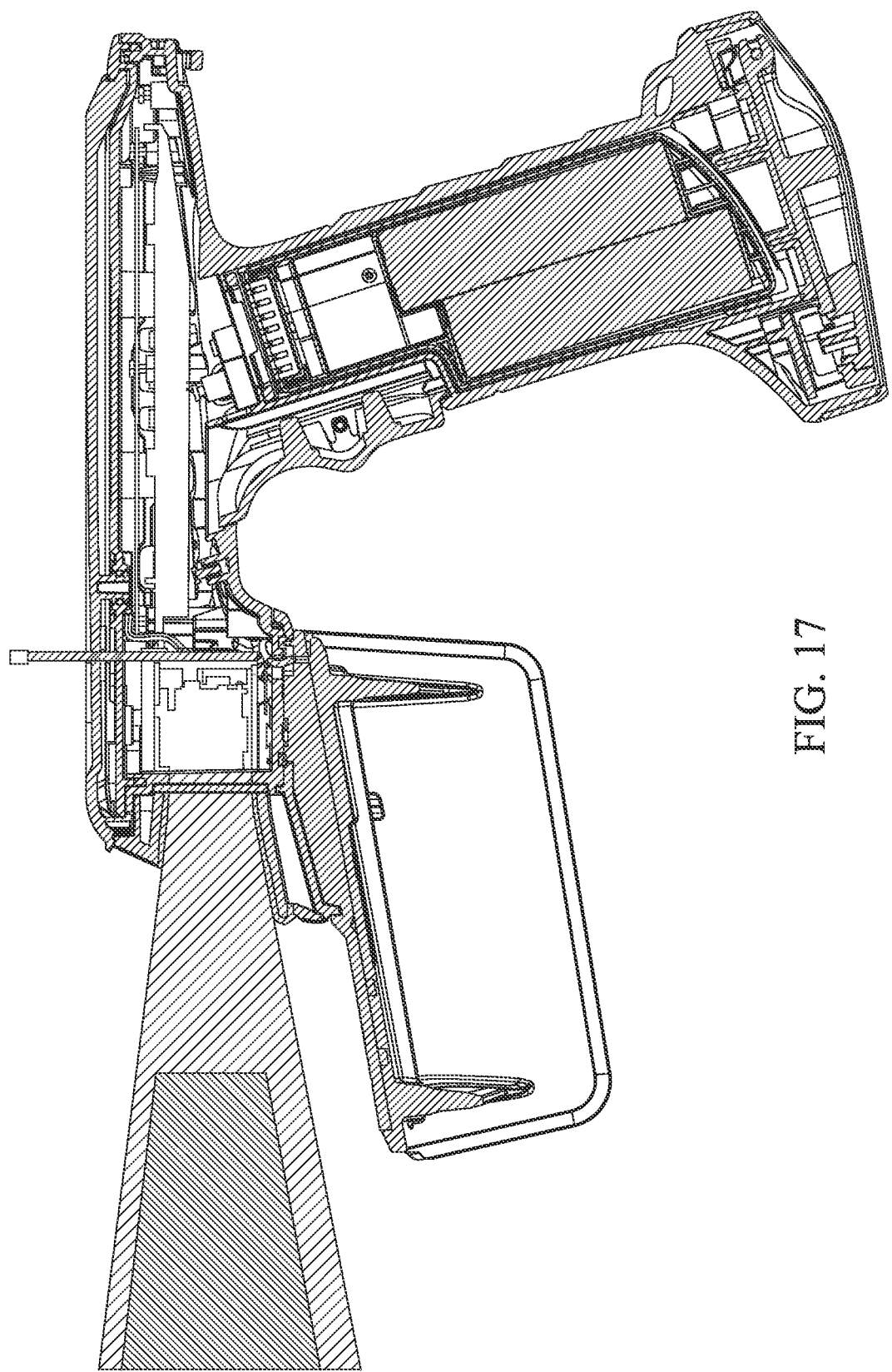
FIG. 17 illustrates a side elevation cross-sectional view of an alternative example handheld scanning device in accordance with various embodiments.

Further, as illustrated in FIG. 16 and as previously noted, in some forms, the rear antenna housing may be integrally formed with at least a portion of the main housing. Further, as illustrated in FIG. 17, a long-range scanning device is provided capable of scanning and/or receiving RFID signals from objects positioned a greater distance from the scanning device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A handheld scanning device, comprising:
a main housing including a main body portion and a grip portion operably coupled with the main body, the main housing defining a main housing cavity;
an antenna housing operably coupled with the main housing, the antenna housing defining an antenna housing cavity;
an antenna mounting bracket at least partially disposed within the antenna housing cavity, the antenna mounting bracket being operably coupled with the antenna housing and the main body portion of the main housing; and
a first radio frequency identification (RFID) antenna disposed within the antenna housing cavity, the first RFID antenna being operably coupled with the antenna mounting bracket,
wherein the antenna mounting bracket includes:
a bracket body and a flange portion, wherein the flange portion is operably coupled with an upper portion of the main body portion, and wherein the bracket body floats within the antenna housing such that the bracket body lacks a point of contact with an internal surface of the antenna housing;
at least one hook member disposed on the bracket body, the at least one hook member adapted to receive a first end of the RFID antenna; and
at least one resilient member disposed on the bracket body, the at least one resilient member adapted to receive a second end of the RFID antenna, wherein the bracket body is rotatably displaceable relative to the flange portion.

2. The handheld scanning device of claim 1, wherein the antenna housing comprises an antenna front housing and an antenna rear housing.

3. The handheld scanning device of claim 2, wherein the antenna rear housing is operably coupled with a main body bracket member at least partially disposed within the main housing cavity.

4. The handheld scanning device of claim 2, wherein the antenna rear housing is integrally formed with the main housing.

5. The handheld scanning device of claim 1, wherein the antenna housing includes a plurality of stiffening ribs disposed within the antenna housing cavity to limit relative movement between the antenna mounting bracket and the antenna housing cavity.

6. The handheld scanning device of claim 1, wherein the first RFID antenna includes a first circuit board, a second circuit board, and a structural support disposed between the first and the second circuit boards, the first circuit board being electrically coupled with the second circuit board.

7. The handheld scanning device of claim 6, wherein the structural support comprises a third circuit board and a fourth circuit board.

8. The handheld scanning device of claim 1, wherein the bracket body is rotatably displaceable relative to the flange portion.

9. The handheld scanning device of claim 1, further including an imaging system at least partially disposed within the antenna housing cavity, the imaging system adapted to capture at least one image of an object appearing in a field of view (FOV) of the device.

10. An antenna system for a handheld scanning device comprising:
   an antenna housing defining an antenna housing cavity;
   an antenna mounting bracket at least partially disposed within the antenna housing cavity, the antenna mounting bracket being operably coupled with the antenna housing via a flange portion, the antenna mounting bracket further having a bracket body; and
   a radio frequency identification (RFID) antenna disposed within the antenna housing cavity, the RFID antenna being operably coupled with the bracket body of the antenna mounting bracket;
   wherein the bracket body floats within the antenna housing such that the bracket body lacks a point of contact with an internal surface of the antenna housing;
   wherein the antenna mounting bracket further includes:
   at least one hook member disposed on the bracket body, the at least one hook member adapted to receive a first end of the RFID antenna; and
   at least one resilient member disposed on the bracket body, the at least one resilient member adapted to receive a second end of the RFID antenna, wherein the bracket body is rotatably displaceable relative to the flange portion.

11. The antenna system of claim 10, wherein the antenna housing comprises an antenna front housing and an antenna rear housing.

12. The antenna system of claim 10, wherein the antenna housing includes a plurality of stiffening ribs disposed within the antenna housing cavity to limit relative movement between the antenna mounting bracket and the antenna housing cavity.

13. The antenna system of claim 10, wherein the RFID antenna includes a first circuit board, a second circuit board, and a structural support disposed between the first and the second circuit boards, the first circuit board being electrically coupled with the second circuit board.

* * * * *